(12) United States Patent
Stead

(10) Patent No.: US 6,430,574 B1
(45) Date of Patent: Aug. 6, 2002

(54) METHOD AND APPARATUS FOR DISPLAYING AND HEADER SCROLLING A HIERARCHICAL DATA STRUCTURE

(75) Inventor: Larry Stead, Upper Montclair, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 09/465,423

(22) Filed: Dec. 16, 1999

Related U.S. Application Data

(60) Provisional application No. 60/145,015, filed on Jul. 22, 1999.

(51) Int. Cl.[7] .............................................. G06F 17/00
(52) U.S. Cl. ............................ 707/104.1; 707/4; 707/8; 707/103; 345/784; 345/785; 345/786; 345/787; 345/830
(58) Field of Search ...................... 707/4, 8, 102, 707/103, 104.1; 345/440, 841, 853, 854, 784–787, 830

(56) References Cited

U.S. PATENT DOCUMENTS

| | | | | |
|---|---|---|---|---|
| 5,606,654 A | * | 2/1997 | Schuur | 395/140 |
| 5,701,137 A | * | 12/1997 | Kiernan et al. | 345/119 |
| 5,812,135 A | * | 9/1998 | Kotchey | 345/356 |
| 5,917,492 A | * | 6/1999 | Bereiter et al. | 345/357 |
| 5,923,328 A | * | 7/1999 | Griesmer | 345/357 |
| 6,236,400 B1 | * | 5/2001 | Guerrero | 345/356 |

* cited by examiner

Primary Examiner—Diane D. Mizrahi
Assistant Examiner—Jacques Veillard
(74) Attorney, Agent, or Firm—Kenyon & Kenyon

(57) ABSTRACT

Methods and apparatus can scroll a displayed hierarchical data structure. A hierarchical data structure can include a first parent node and a plurality of child nodes of the parent node, the plurality of subordinate nodes including a first child node and a second child node. The first parent node can be displayed in a first position of a display area. The first child node can be displayed in a second position of the display area, the second position being adjacent the first position. The second child node can be displayed in the display area. A first instruction to scroll at least the second child node in a direction toward the first position can be received, and the second child node can be displayed in the second position.

14 Claims, 13 Drawing Sheets

KNOWN ART

KNOWN ART

KNOWN ART

KNOWN ART

METHOD AND APPARATUS FOR DISPLAYING AND HEADER SCROLLING A HIERARCHICAL DATA STRUCTURE

CROSS REFERENCE TO RELATED APPLICATION

The present application claims the benefit of U.S. provisional patent application Ser. No. 60/145,015 entitled "DISPLAYING AND SCROLLING A HIERARCHICAL DATA STRUCTURE" filed on Jul. 22, 1999.

FIELD OF THE INVENTION

Embodiments of the present invention relate to text and graphical data user interfaces. More particularly, embodiments of the present invention relate to displaying and scrolling a hierarchical data structure.

BACKGROUND OF THE INVENTION

Modern computers and data processing devices typically utilize displays such as CRT's (Cathode Ray Tubes) and LCD's (Liquid Crystal Displays) to display text and graphics data. A user interacts with an application program that allows the creation, viewing and/or editing of a data file or document on the display device.

Data files or documents often contain a large amount of text and graphics data that cannot be displayed simultaneously on a display. Examples of documents include word processing documents, spread sheet documents, e-mail documents, etc. For example, many application programs produce display output in a format known as WYSIWYG (What You See Is What You Get), which produces a screen display substantially identical to a printed output. WYSIWYG output may include text of varying font sizes, types, etc. using a variety of formatting. Because a data file rendered according to WYSIWYG typically occupies many pages, only a portion of the document can displayed at one time.

Computing devices typically can execute a technique known as scrolling to permit a user to navigate through a document. Scrolling is an operation in which a user issues commands to a computing device to instruct it to display a particular portion of data on a display. The user scrolls a document by issuing commands through a keyboard or mouse.

Known scrolling controls include a scroll bar, consisting of an icon displayed on the display, that allows the user to instruct the computer (via a pointing device such as a mouse) to display a different portion of the document. Conventional scrolling controls provide a wide range of functionality, typically allowing the user to scroll data up, down, left or right.

FIG. 1A shows a conventional user interface with scrolling functionality. Typically the user interface depicted in FIG. 1A may be implemented in a windows environment but can also be applicable to a non-windows environment. In one embodiment, the conventional user interface is a graphical user interface (GUI). The user interface depicted in FIG. 1A includes an arrangement of control icons for performing scrolling operations. Window 105 consists of a display area 110, left scrolling button 150, right scrolling button 170, horizontal scroll bar 160, up scrolling button 120, down scrolling button 140, and vertical scroll bar 130. When a user selects any of left scrolling button 150, right scrolling button 170, up scrolling button 120 or down scrolling button 140 by clicking on the respective scrolling button using a mouse, window 105 scrolls in the respective direction. The scrolling windows includes portions of data 14–26. The position of the horizontal scroll bar 160 showing that additional data can be displayed to the left and the right, and the position of the vertical scroll bar 130 showing that additional data can be displayed to the top and the bottom. The user may also scroll window 105 by clicking and dragging horizontal scroll bar 160 or vertical scroll bar 130 in the desired direction of scrolling.

FIG. 1B illustrates a known layout of a conventional user interface in relationship to an underlying data file or document 210. Document 210 contains text or graphics data that cannot be practicably displayed within display area 110 of window 105, e.g., data 11–31. Thus, typically only a portion of the data of document 210 is displayed within display area 110 of window 105, e.g., portions of data 14–26.

Known scrolling methods are not sensitive to the structure of the data to be displayed. Data is often implicitly or explicitly structured hierarchically. For example, a word processing document of a book can be divided into a set of chapters, each chapter further divided into a number of subsections, and so on. A hierarchical relationship inherent in a set of data can be represented using a tree data structure that consists of a set of parent and child nodes, each node corresponding to a particular data object. For example, using the prior example of a book word processing document, the data could be represented using multiple trees, with each chapter comprising a root node of a distinct tree data structure. Each section within a chapter could be represented as a child node of the root. Furthermore, each subsection could be represented as a child node of a corresponding section child node, and so on. In another embodiment, a book document could contain a book root node with the chapters being child nodes of the book root node.

FIG. 2 shows a diagram depicting an example of a tree data structure. Tree 205 includes root node 210, non-terminal nodes 215, and terminal (i.e., leaf) nodes 220 arranged in a parent-child structure. Root node 210 is the ancestor of every node in tree 205. Non-terminal nodes 215 are typically characterized as having an ancestor node and at least one child node. Terminal nodes 220 are typically characterized as having an ancestor node and no child nodes.

Due to limitations of conventional scrolling methods a display output may not show pertinent hierarchical relationships, which can result in confusion and inefficiency for the user. For example, when perusing hierarchical data it can be advantageous that the hierarchical structure of data be conveyed to the user. For example, a text document may consist of a number of headers, each header associated with a set of subordinate body lines. An example of this structure is a newspaper document, consisting of a set of headlines (headers) and corresponding body lines correspond to the text pertaining to each particular headline. If a user were to peruse a paper newspaper, and a story were continued from the front page to an inner page, the inner page would typically contain the headline text at an appropriate position where the story was continued so that the user could quickly move to this section. However, if a user were to scroll a document containing a new articles using conventional scrolling methods, the body of the news story can be displayed without the corresponding headline when the headline has been scrolled off of the display.

FIG. 3 illustrates a display of data in a conventional scrolling user interface. Display area 310 shows data including first data header 310, second data header 320, and third data header 330. Below first data header 310 is displayed subordinate data 311–314, below second data header 320 is displayed subordinate data 321–325, and below third data header 330 is displayed subordinate data 331–334. Each of header data headers 310, 320, 330, together with their respective subordinate data, correspond to an underlying hierarchical tree structure, 301–303. FIG. 3 does not include information indicating what proportion of the subordinate data of a data header is currently displayed (e.g., whether data header 330 only has subordinate data 331–334, or whether data header 330 has additional subordinate data in addition to subordinate data 331–334).

FIG. 5 illustrates the hierarchical relationship of the data displayed in FIGS. 3–4. Specifically, data trees 301–304 of FIG. 5 respectively contain root nodes 310–340. Root nodes 310–340 respectively correspond to the data headers 310–340 of FIGS. 3–4. Data trees 301–304 of FIG. 5 respectively contain a set of child leaf nodes 311–314, 321–325, 331–335, and 340–344. FIGS. 3–4 display varied portions of the data headers 310–340 and subordinate data 311–314, 321–325, 331–335, and 340–344 corresponding to the root nodes 310–340 and child leaf nodes 311–314, 321–325, 331–335, and 340–344 of FIG. 5.

FIG. 4 illustrates a display of data in a conventional scrolling user interface after a three line vertical scrolling operation with respect to the display of data in FIG. 3. For example, FIG. 4 illustrates a display of data after the user has scrolled the display up three lines, either by moving the scroll bar 130 down or by clicking on the down scroll button 140. After a conventional scrolling operation, the header 310 corresponding to tree structure 301 is no longer visible in display area 310. Accordingly, data 313–14 are displayed without their corresponding header 310. When header 310 contains pertinent information related to subordinate data 313–314, the user does not have access to this pertinent information in the display area, thereby limiting the usefulness of the conventional user interface. While the data header and certain of the subordinate data corresponding to tree structure 301 is no longer visible, a portion of the data of tree structure 304 is now visible in display area 310 including data header 340 and subordinate data 341. FIG. 4 does not include information indicating what proportion of the subordinate data of a data header is currently displayed (e.g., whether data header 340 has any subordinate data beyond subordinate data 341, etc., what proportion of subordinate data of a data head that subordinate data 313–314 comprise, etc.). In view of the foregoing, it can be appreciated that a substantial need exists for methods and apparatus which can advantageously display and scroll hierarchical data.

SUMMARY OF THE INVENTION

Embodiments of the present invention include methods and apparatus to scroll a displayed hierarchical data structure. A hierarchical data structure can include a first parent node and a plurality of child nodes of the parent node, and the plurality of subordinate nodes can include a first child node and a second child node. The first parent node can be displayed in a first position of a display area. The first child node can be displayed in a second position of the display area, with the second position being adjacent the first position. The second child node can be displayed in the display area. A first instruction to scroll at least the second child node in a direction toward the first position can be received, and the second child node can be displayed in the second position.

DETAILED DESCRIPTION

Embodiments of methods and apparatus to display and header scroll hierarchical data are described. In the following description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

Figure 6:
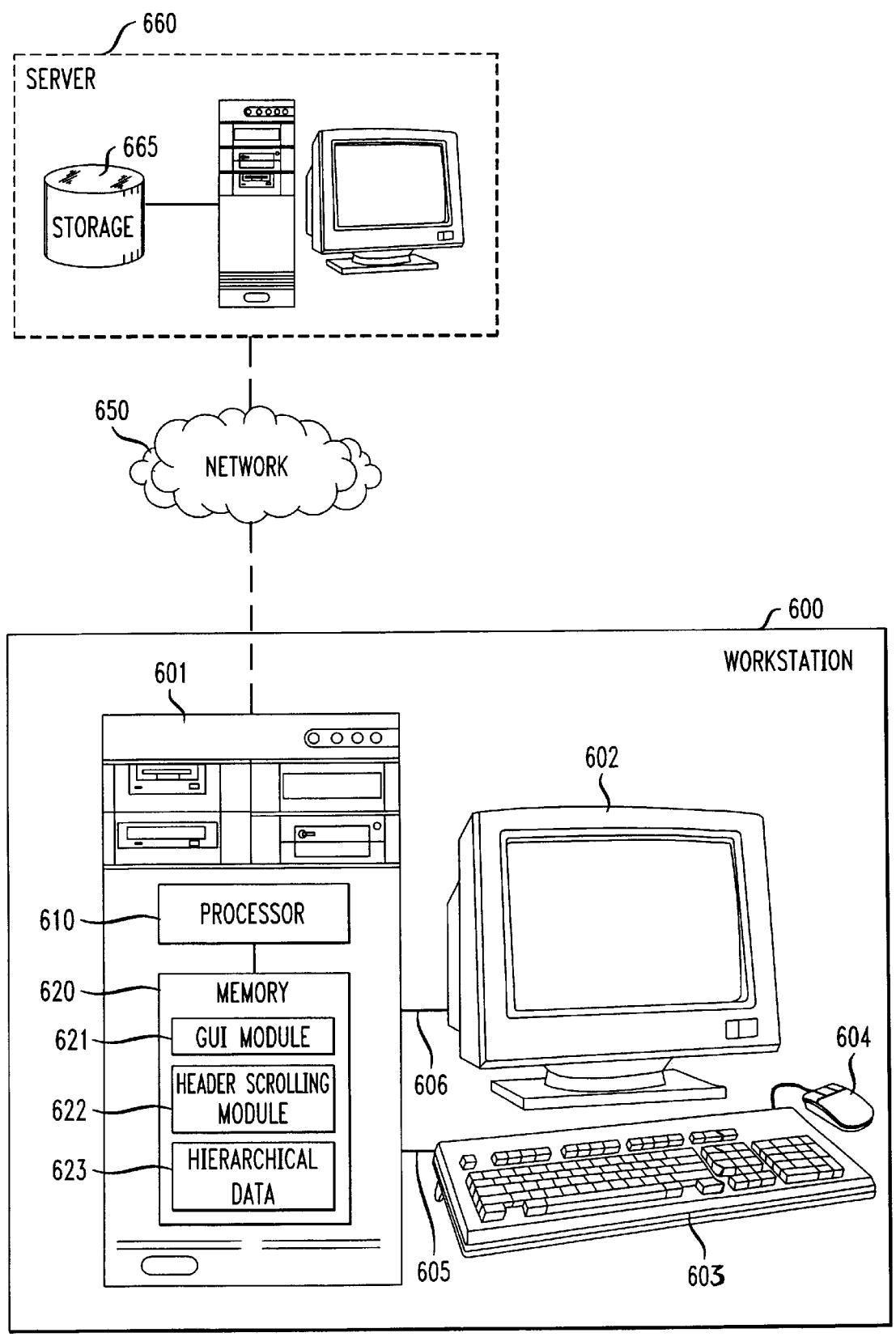
FIG. 6 shows an illustration of a system in accordance with an embodiment of the present invention.

FIG. 6 shows an illustration of a system in accordance with an embodiment of the present invention. A workstation 600 includes computer 601, which can coupled to a video display 602 via an external graphics bus 606. The external graphics bus 606 can be an Advanced Graphics Port (AGP) compliant bus. Computer 250 in one embodiment includes a processor 610, such as the Pentium® III processor manufactured by Intel Corp. of Santa Clara, Calif. In another embodiment, the processor 610 can be an Application Specific Integrated Circuit (ASIC). Computer 601 can includes a memory 620 coupled to the processor. The term "coupled" means connected directly or indirectly. The memory 620 includes a devices adapted to store digital information, such as Dynamic Random Access Memory (DRAM), Rambus® DRAM (RDRAM), flash memory, a hard disk, an optical digital storage device, or a combination thereof, etc. Rambus® technology is licensed by Rambus Inc. of Mountain View, Calif. The computer 601 can be coupled to a keyboard 603 and a mouse 604 via an external computer bus 605. In one embodiment, the external computer bus 605 is a Universal Serial Bus (USB) compliant bus.

Memory 620 can include instructions adapted to be executed by the processor 610 to perform a method in accordance with an embodiment of the present invention. The term "instructions adapted to be executed" is meant to encompass any instructions that are ready to be executed in their present form (e.g., machine code) by a processor, or require further manipulation (e.g., compilation, decryption, decoding, or provided with an access code, etc.) to be ready to be executed by a processor (e.g., processor 610). In one embodiment, the memory 620 can include a GUI module 621 to implement a GUI (i.e., graphical user interface). In conjunction with the GUI module 621, a header scrolling module 622 can implement an embodiment of the present invention with respect to hierarchical data 623.

In another embodiment of the present invention, the workstation 600 is coupled to a server 660 via a network 650. In one embodiment, the server 660 is coupled to a storage device 665 that typically stores data on a magnetic medium such as a magnetic disk. For example, storage device 665 may store application programs and associated data files/documents. The documents may include, for example, word processing documents, spreadsheet documents, HTML (Hypertext Markup Language) documents, etc. Workstation 600 may access data stored in storage device 665 via server 660 and network 650.

Header scrolling module 622 and GUI module 621 can be subcomponents of an operating system running on workstation 600. In another embodiment, header scrolling module 622 and GUI module 621 can be supplementary routines of a particular application program running on workstation 600. In a further embodiment, header scrolling module 622 and GUI module 621 are implemented as JAVA applets and stored on server 660. In such an embodiment, header scrolling module 622 and GUI module 621 are downloaded as appropriate or as integrated components of a particular JAVA applet via network 650 to workstation 600 and are executed via a JAVA virtual machine implemented on workstation 600. An advantage of a JAVA implementation is that scroll handling module 622 and GUI module 621 can be written and function independently of platform specific workstation 600.

In another embodiment, header scrolling module 622 and GUI module 621 are accessed through an application programmer's interface (API) that provides a convenient encapsulation structure for invoking the header scrolling module 622 and the GUI module 621. For example, according to one embodiment of the present invention, header scrolling module 622 and GUI module 621 are implemented using a class structure in C++ or JAVA.

Hierarchical data 623 can be a document corresponding to a particular application such as a word processing document, a spreadsheet document, an HTML document, etc. In accordance with one embodiment of the present invention, hierarchical data 623 includes ASCII text strings stored using a tree data structure including a set of parent and child nodes. In accordance with such an embodiment, a JAVA class is used to implement the tree structure. In particular, a root node class contains a member variable consisting of an array of pointers to reference a set of child nodes. According to such an embodiment, a child node class contains a member variable pointer referencing the root/parent node. Thus, each instance of the parent node object contains a set of pointers referencing each of its child nodes, and each instance of a child node object contains a pointer referencing the parent/root node.

In one embodiment of the present invention, hierarchical data is stored using a tree data structure. In another embodiment of the present invention, hierarchical data does not reside in an explicit tree data structure. For example, hierarchical data 623 may be part of an HTML document, which HTML document can be considered to include hierarchical data because it contains a number of tagged data objects, each tagged data object occupying a distinct hierarchical position in the document. Although the HTML language does not explicitly represent a hierarchical relationship using a tree data structure, a separate software component can be implemented that parses a particular hierarchical data set or document to produce as output a tree data structure capturing the hierarchical relationships of the data.

Figure 7:
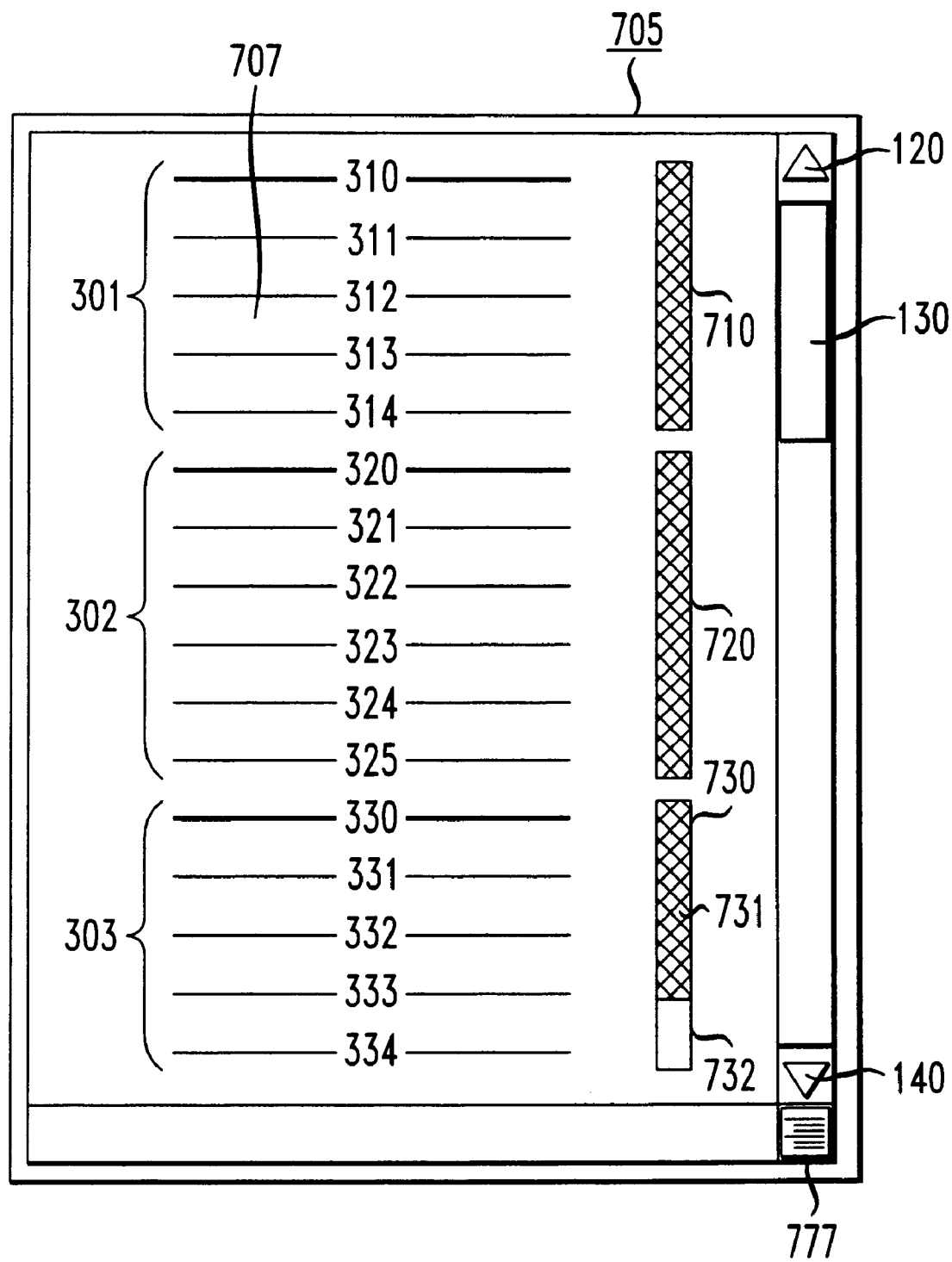
FIG. 7 illustrates a user interface with enhanced scrolling features to display and header scroll a hierarchical data structure in accordance with one embodiment of the present invention.

FIG. 7 illustrates a user interface with enhanced scrolling features to display and header scroll a hierarchical data structure in accordance with one embodiment of the present invention. The user interface illustrated in FIG. 7 can be implemented in a text based environment and/or a graphical environment and viewed by a user on a display (e.g., CRT display, video monitor, LCD screen, a display of a hand-held device, etc.). According to one embodiment of the present invention, the scrolling system includes a number of graphical icons, which allow control of various scrolling functions. In one embodiment, the user can interact with the graphical icons by pointing with a mouse (or by directing a cursor or selection icon over an area of a graphic icon displayed on the display) and pressing the mouse button to select or activate the a graphical icon. According to one embodiment of the present invention, each graphical icon may be instantiated as an object using a class structure. For example, using the C++ object oriented paradigm, each object may consist of a number of member variables and functions for control and interaction with the object.

According to one embodiment of the present invention, window 705 can include display area 707. Display area 707 shows data including data headers 310, 320, and 330. Subordinate data 311–314 is displayed below data header 310, subordinate data 321–325 is displayed below data header 320, and subordinate data 331–334 is displayed below data header 330. Each of data headers 310, 320, 330, together with their respective subordinate data, correspond to a hierarchical data structure, 301–303.

Figure 5:
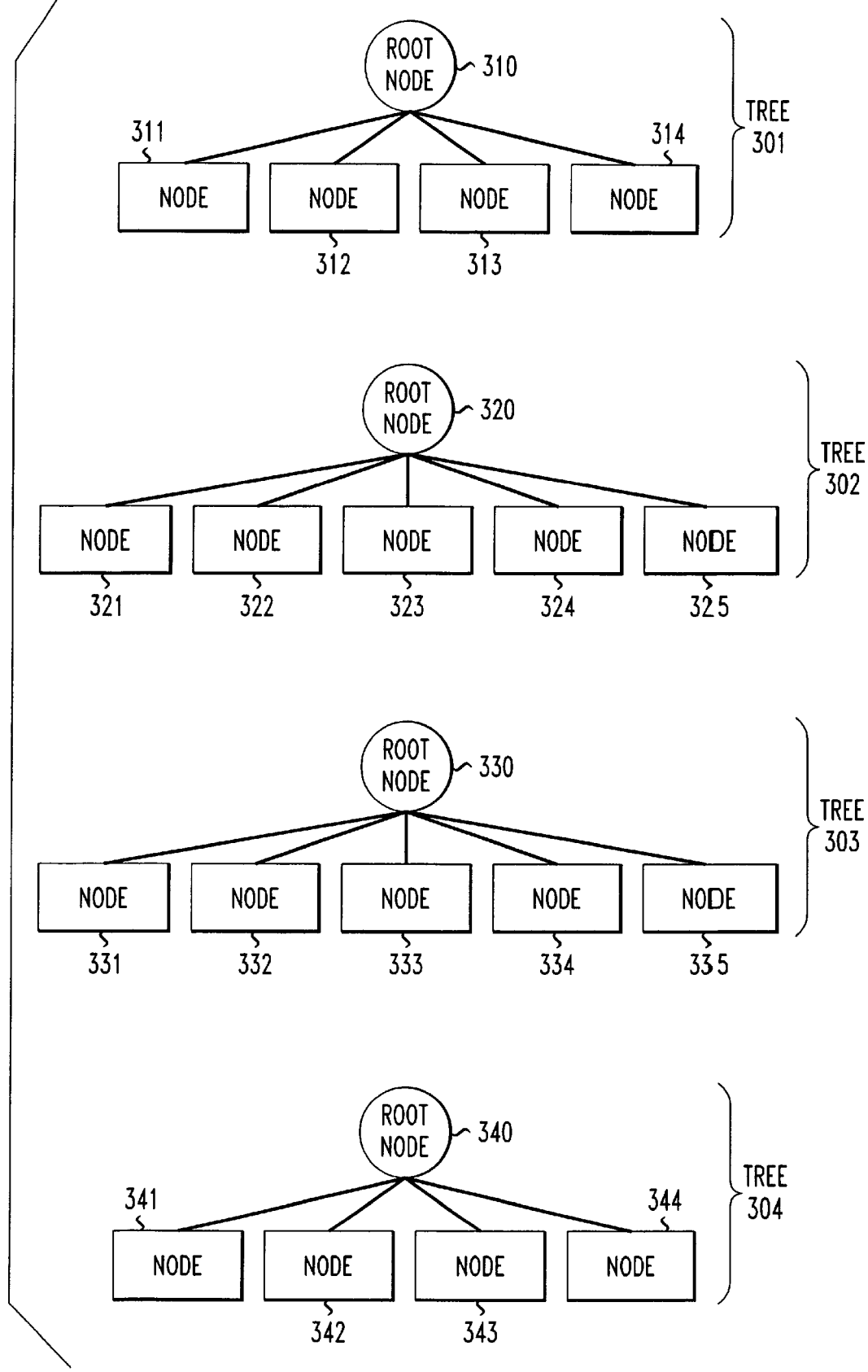
FIG. 5 illustrates the hierarchical relationship of the data displayed in FIGS. 3–4.
Figure 8:
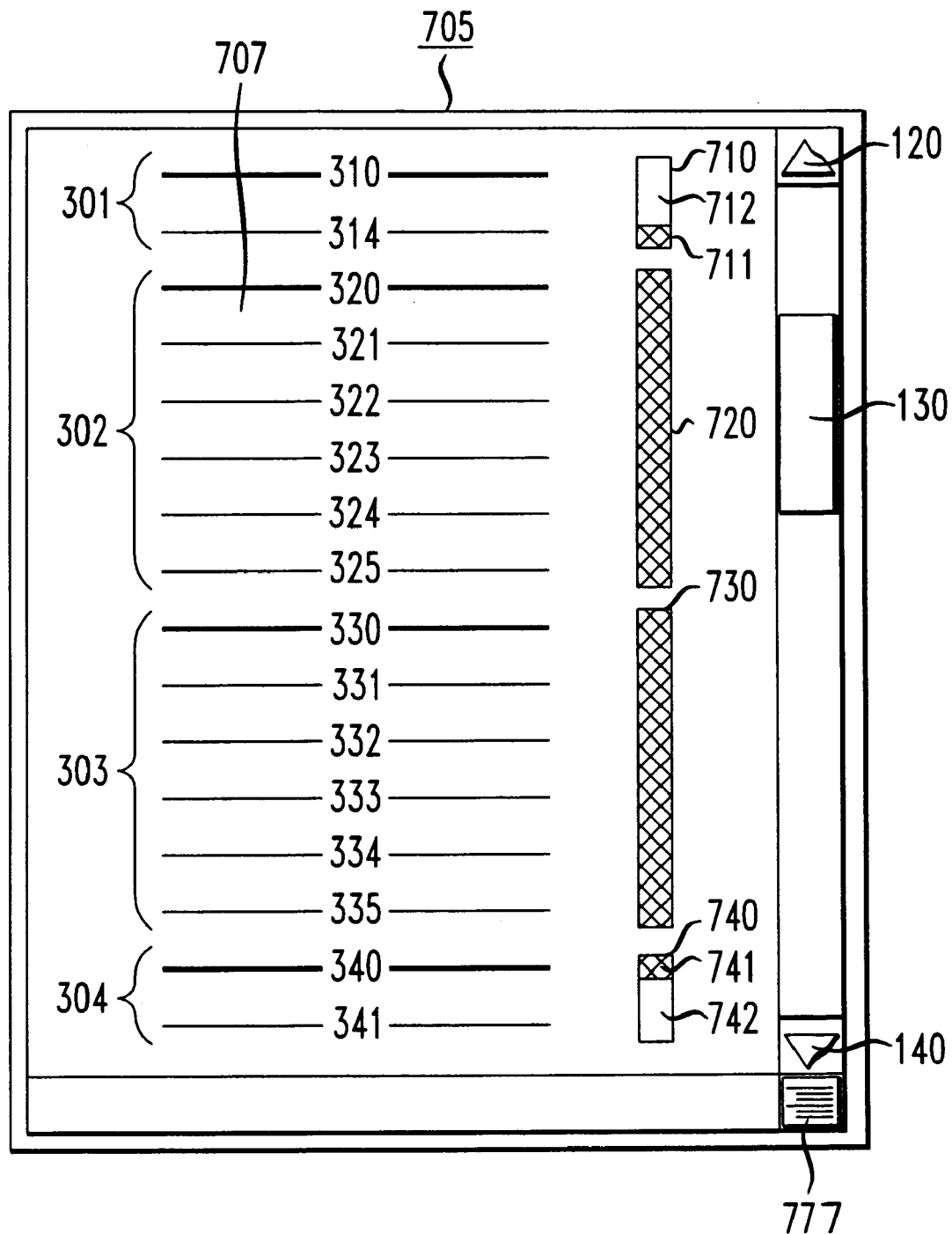
FIG. 8 illustrates the user interface of FIG. 7 after a scrolling operation has been performed.

The hierarchical data displayed in FIG.7 and FIG. 8 is also illustrated in FIG. 5. Specifically, data trees 301–304 of FIG. 5 respectively contain root nodes 310–340. Root nodes 310–340 respectively correspond to the data headers 310–340 of FIGS. 7–8. Data trees 301–304 of FIG. 5 respectively contain a set of child leaf nodes 311–314, 321–325, 331–335, and 340–344. FIGS. 7–8 display varied portions of the data headers 310–340 and subordinate data 311–314, 321–325, 331–335, and 340–344 corresponding to the root nodes 310–340 and child leaf nodes 311–314, 321–325, 331–335, and 340–344 of FIG. 5.

The embodiment illustrated in FIG. 7 includes subordinate data descriptors 710, 720, and 730, each of which can indicate the proportion of the subordinate data of a data header that is currently displayed (e.g., whether data header 330 only has subordinate data 331–334, or whether data header 330 has additional subordinate data in addition to subordinate data 331–334). Subordinate data descriptor 710 is displayed adjacent data header 310 and the subordinate data of data header 310. The subordinate data descriptor 730 includes a first dynamic display portion 731 and a second dynamic display portion 732. One portion of a subordinate data descriptor can illustrate the proportion of subordinate data currently displayed with the data header, and the other portion can illustrate the proportion of subordinate data currently not displayed with the data header.

First portion 731 of subordinate data descriptor 730 is shaded and comprises roughly four-fifths of the area of subordinate data descriptor 710 and thereby indicates that four-fifths of the subordinate data of data header 330 is currently displayed. Second portion 732 of subordinate data descriptor 730 is not shaded and comprises roughly one-fifth of the area of subordinate data descriptor 730 and thereby indicates that one-fifth of the subordinate data of data header 330 is currently not displayed. Subordinate data descriptor 710 is entirely shaded, and thereby indicates that all of the subordinate data of data header 310 is currently displayed. Likewise, subordinate data descriptor 720 is entirely shaded, and thereby indicates that all of the subordinate data of data header 320 is currently displayed.

Window 705, in one embodiment, includes a contract button 777. Contact button 777 can be toggled between at least two states to change the display of hierarchical data in window 705. As shown in FIG. 7, contact button 777 shows a two-level hierarchical display has been selected (e.g., by showing an illustration of data including data headers and a first subordinate level of data) and two levels of hierarchical data are displayed within window 705.

Figure 1A:
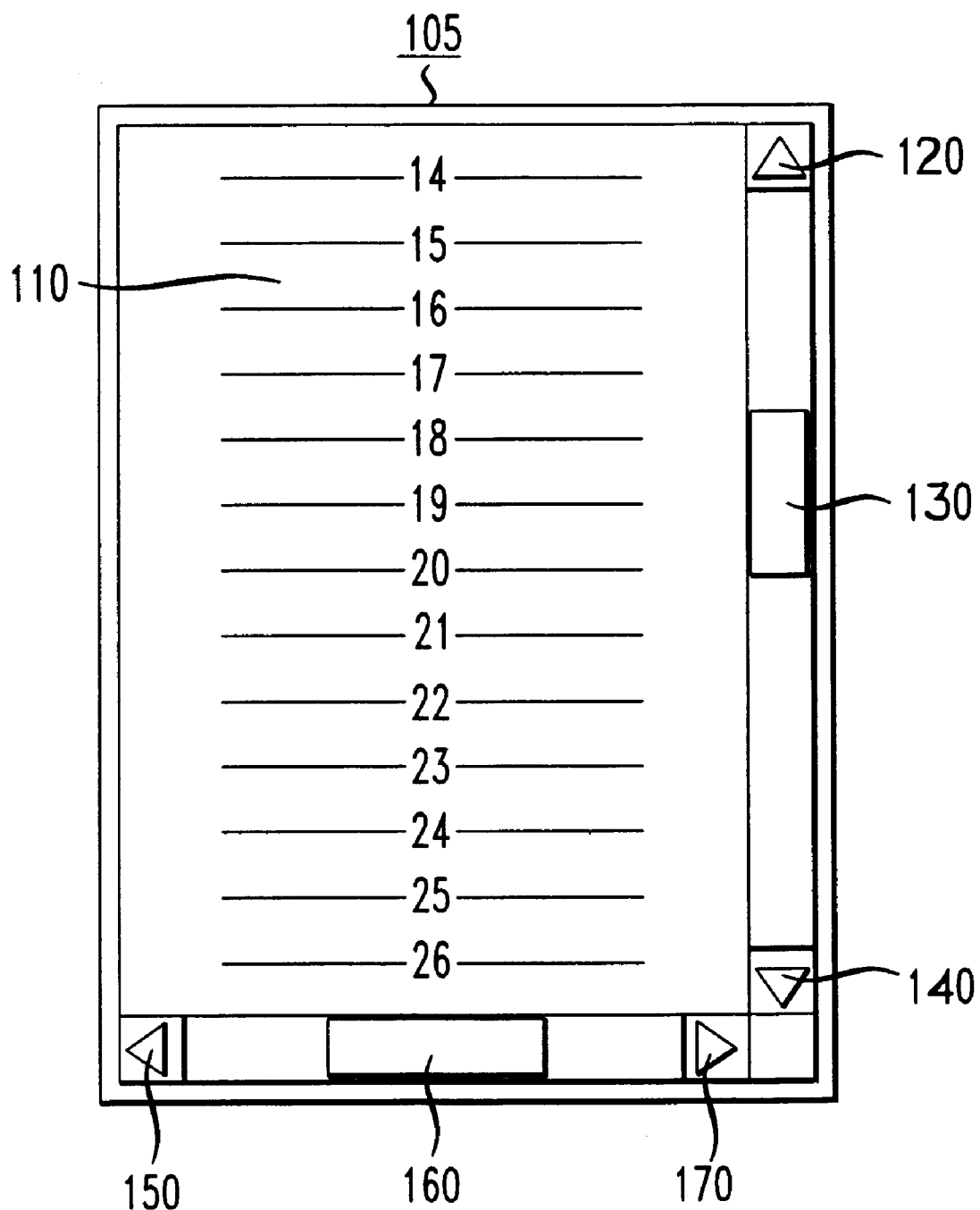
FIG. 1A shows a conventional user interface with scrolling functionality.
Figure 1B:
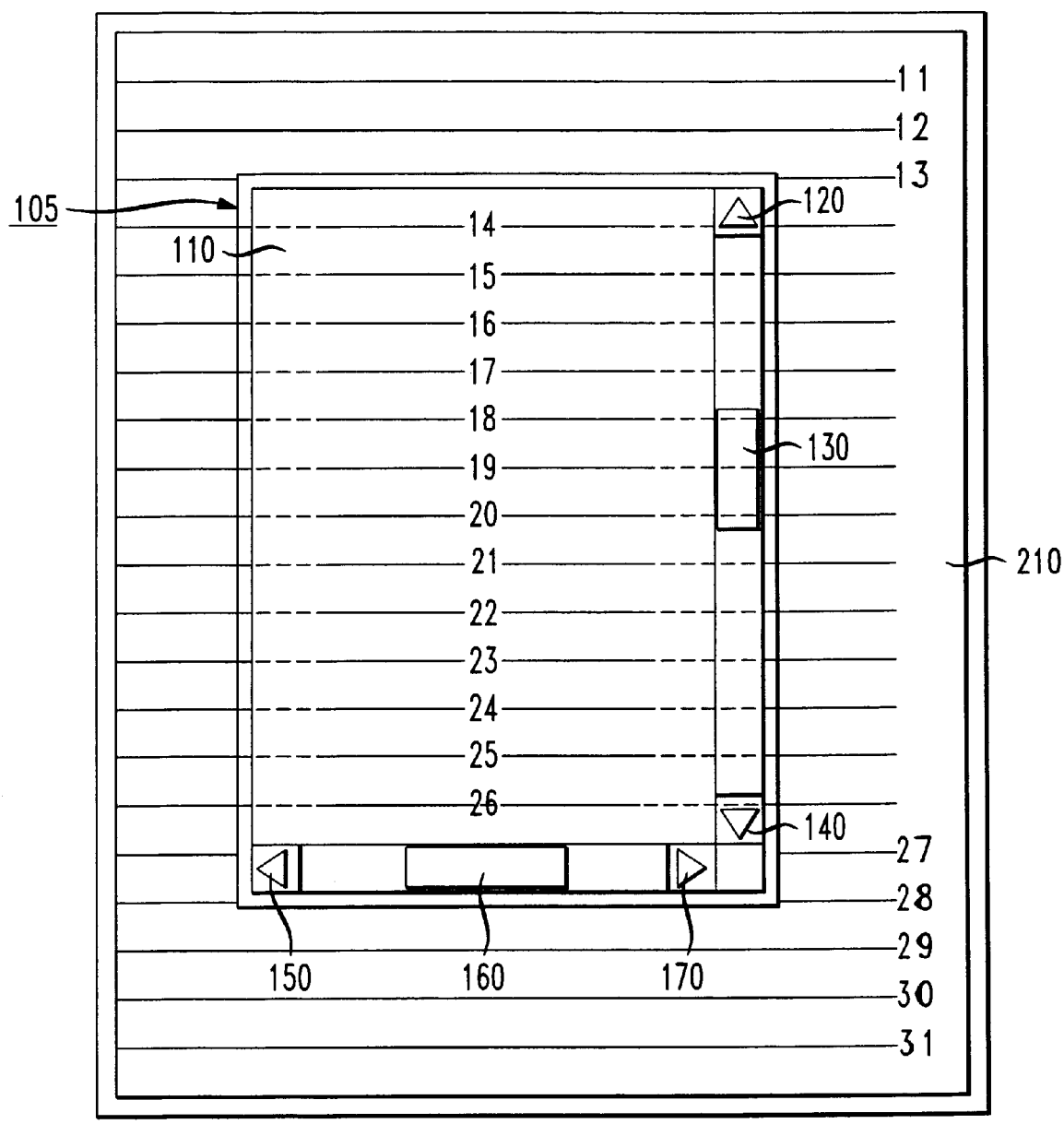
FIG. 1B illustrates a known layout of a conventional user interface in relationship to an underlying data file or document 210.
Figure 2:
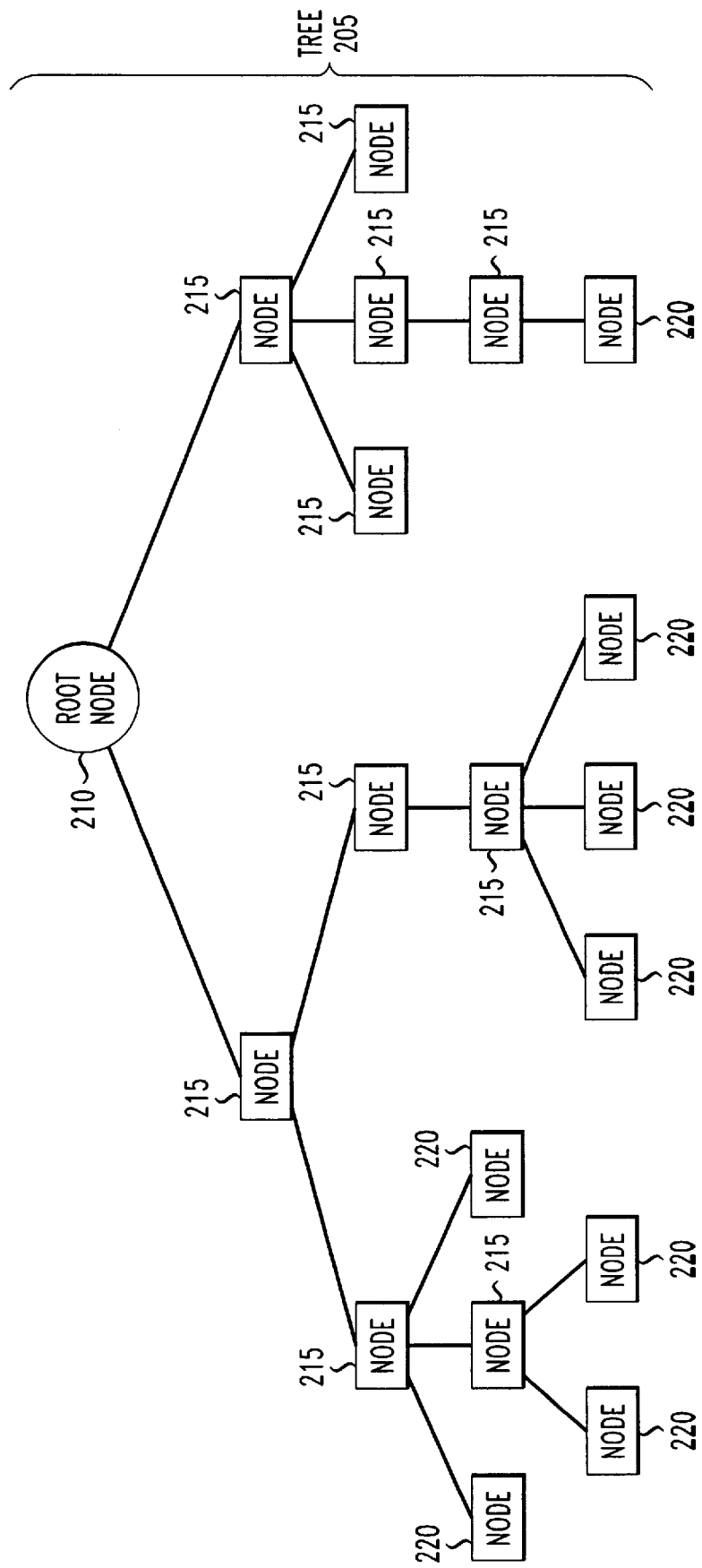
FIG. 2 shows a diagram depicting an example of a tree data structure.
Figure 3:
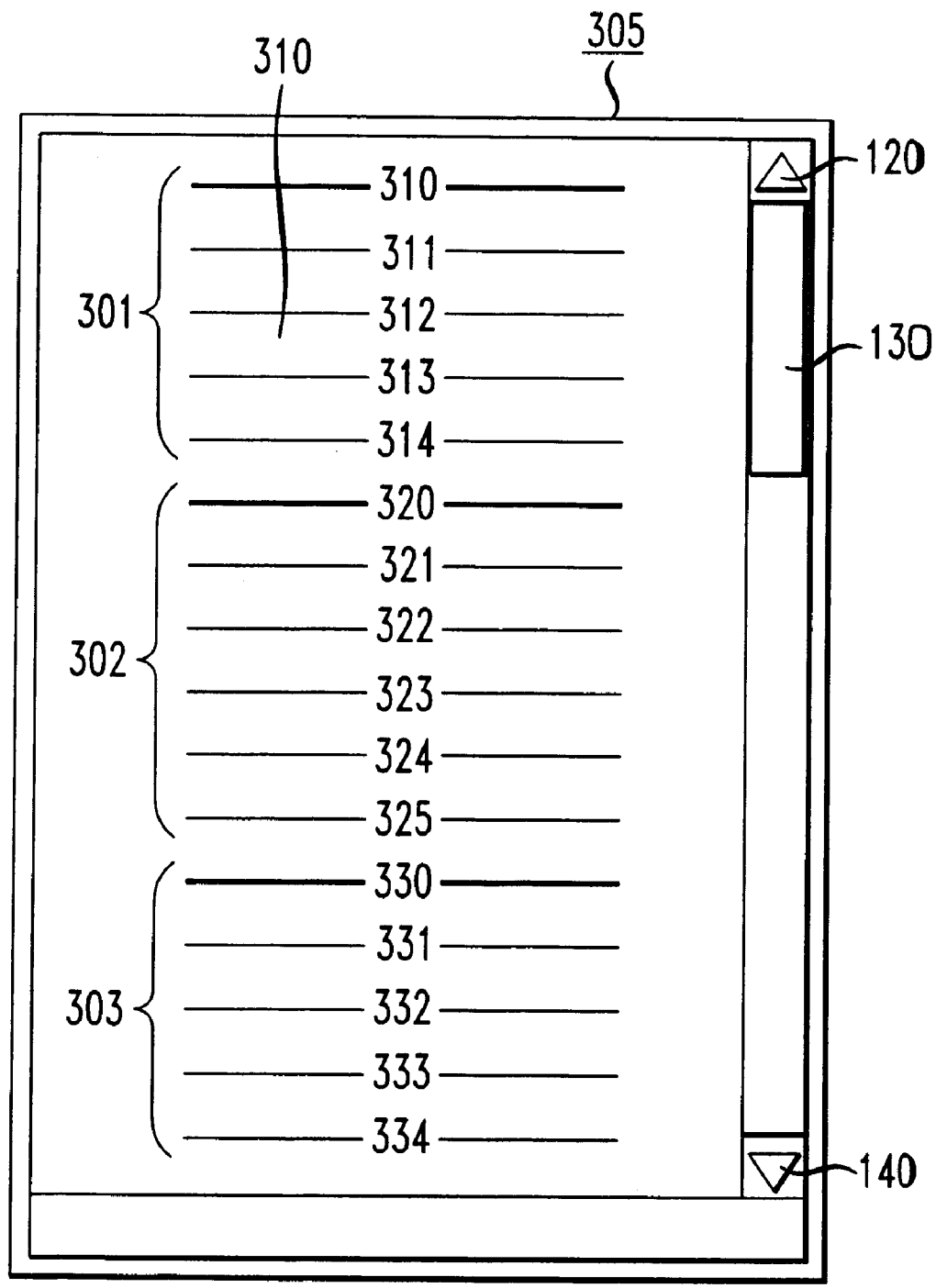
FIG. 3 illustrates a display of data in a conventional scrolling user interface.
Figure 4:
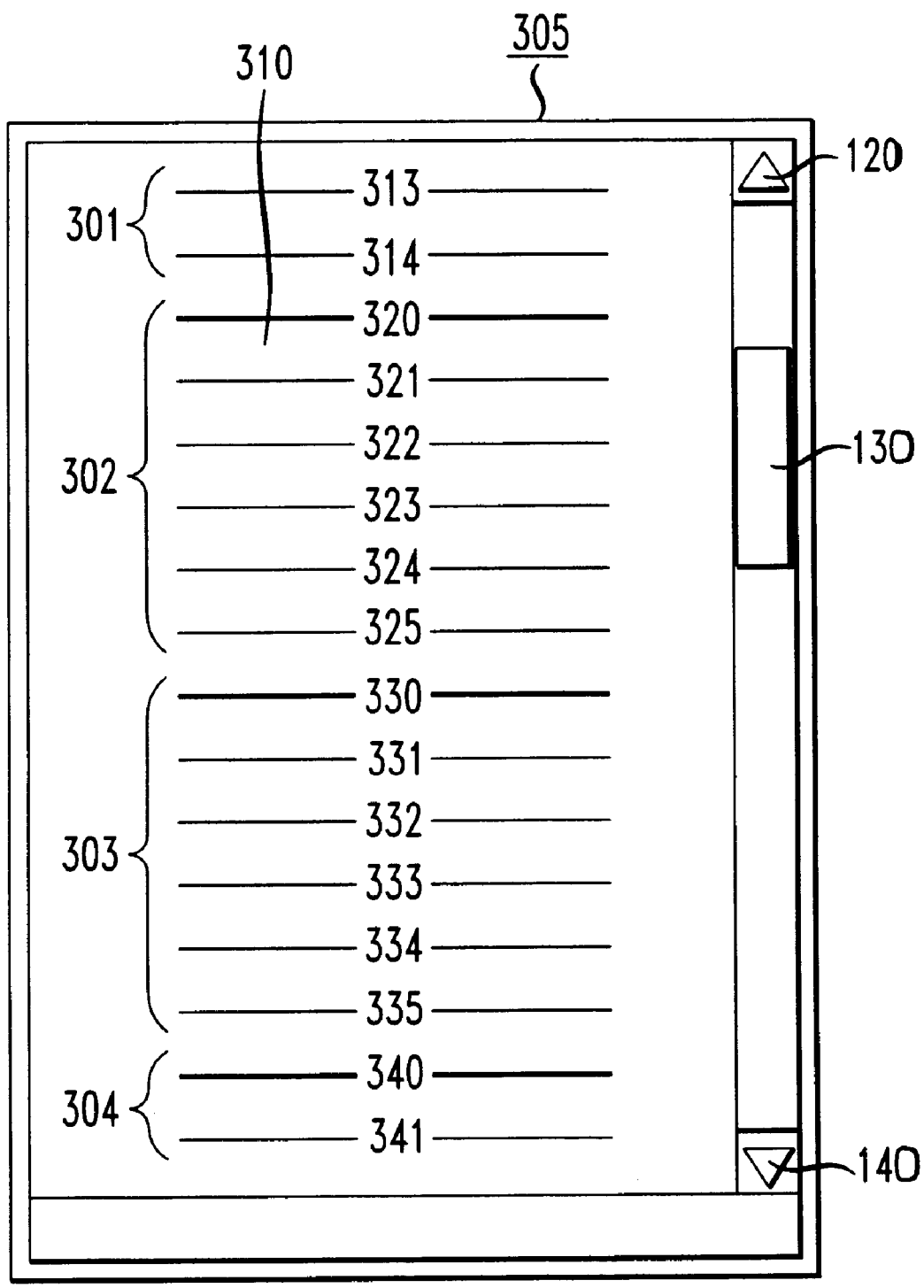
FIG. 4 illustrates a display of data in a conventional scrolling user interface after a three line vertical scrolling operation with respect to the display of data in FIG. 3.

FIG. 8 illustrates the user interface of FIG. 7 after a scrolling operation has been performed. In particular, FIG. 8 depicts the operation of an embodiment of the present invention after a vertical three line scrolling operation as compared the status illustrated in FIG. 7. Comparing the transition shown respectively between FIGS. 3–4 and between FIGS. 7–8 illustrated one feature of an enhanced header scrolling method. Comparing the top lines of FIGS. 4 and 8 in the respective display areas 110, 410 after same three line vertical operation, the top of display area 110 in FIG. 4 shows subordinate data 313 stored in a first position (e.g., an edge position), subordinate data 314 stored in a second position (e.g., a first adjacent edge position), and data header 320 stored in a third position (e.g., a second adjacent position). The top of display area 410 in FIG. 8 shows data header 310 stored in a first position (e.g., an edge position), subordinate data 314 stored in a second position (e.g., a first adjacent edge position), and data header 320 stored in a third position (e.g., second adjacent position).

According to one embodiment of the present invention, a child node is not displayed without displaying the root node of the child node (e.g., when subordinate data is displayed, the subordinate data is displayed with its header data). When a vertical scrolling mechanism is implemented, a top line of the display can always display a root node. Thus, when the top line of the display would normally display a child node using conventional scrolling, the top line in accordance with an embodiment of the present invention displays the root node of the corresponding tree with a child node. An advantage to the user is that the header data of a tree is always displayed. Conventional scrolling can lack sensitivity to the structure of the data. For example, as illustrated in FIGS. 3–4, when child node are displayed without a corresponding parent node, a user would have to rescroll the display in order to determine the corresponding parent node. Thus, the embodiment of the present invention illustrated in FIGS. 7–8 advantageously preserve the hierarchical display of a tree structure after a scrolling operation, which can result in increased efficiency and information content being conveyed to a user.

FIG. 8 also illustrates how subordinate data descriptors can be updated after a scrolling operation. As compared to FIG. 7, the subordinate data descriptor 710 shown in FIG. 8 has been resized so that it continues to be adjacent the data header 310 and the currently displayed subordinate data of data header 310. Subordinate data descriptor 710 now includes a first portion 711 and a second portion 712. The first portion 711 is shaded and indicates the proportion of subordinate data of data header 310 currently displayed. The second portion 712 is not shaded and indicates the proportion of subordinate data of data header 310 currently not displayed. The second portion 712 is displayed above the first portion 711 to indicate that the undisplayed subordinate data of data header 310 has been scrolled off above the top edge of window 705 (e.g., are positioned above the displayed subordinate data). Subordinate data descriptor 730 as illustrated in FIG. 8 is entirely shaded, and thereby indicates that all of the subordinate data of data header 330 is currently displayed.

A data header 340 and its subordinate data 341, which were not displayed in FIG. 7, are displayed within window 705 of FIG. 8. Subordinate data descriptor 740 includes a first portion 741 and a second portion 742 and is displayed adjacent data header 340 and subordinate data 341. First portion 741 of subordinate data descriptor 740 is shaded and shows the proportion of displayed subordinated data of data header 340 (i.e., one-fourth). The second portion 742 is not shaded and indicates the proportion of subordinate data of data header 310 currently not displayed (i.e., three-fourths). The second portion 712 is displayed below the first portion 711 to indicate that the undisplayed subordinate data of data header 340 have not been scrolled above the bottom edge of window 705 (e.g., are positioned below the displayed subordinate data).

Figure 9:
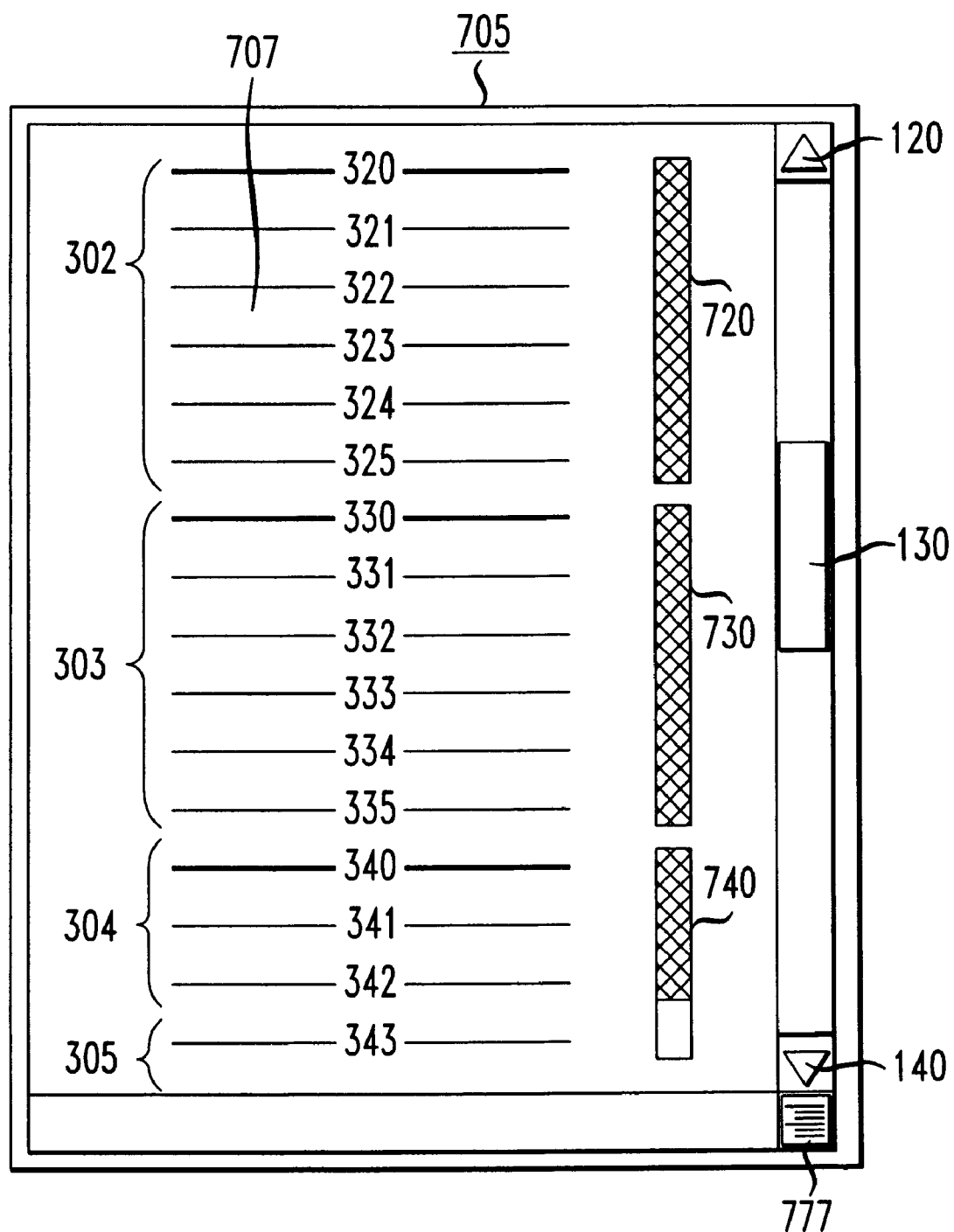
FIG. 9 illustrates the user interface of FIG. 8 after a scrolling operation has been performed.

FIG. 9 illustrates the user interface of FIG. 8 after a scrolling operation has been performed. In particular, FIG. 9 depicts the operation of an embodiment of the present invention after a vertical line scrolling operation has been performed as compared the status illustrated in FIG. 8. Subordinate data 314 was the only subordinate data of header data 310 being displayed in FIG. 8. An instruction was received to scroll the data one position toward the top of window 705 was received, and a header scrolling module (e.g., header scrolling module 622 of FIG. 6) determined that subordinate data 314 was the only subordinate data of header data 310 being displayed. Rather than displaying subordinate data 314 without displaying header data 310, a two position scrolling of the data toward the top of window 705 was performed and header data 320 is displayed in the position where header data 310 was formerly displayed (e.g., a top line position, an edge position, etc.).

In accordance with one embodiment of the present invention, portions and/or the entirety of a subordinate data descriptor can have three distinct display states (e.g., have three different colors, have three distinct shading levels, have three distinct display patterns, etc.). For example, when a subordinate data descriptor is displayed as related to a parent node (e.g., adjacent the parent node, adjacent the parent node and child nodes of the parent node), a black portion of the subordinate data descriptor can indicate what proportion of child nodes of the parent node is displayed. A subordinate data descriptor that is entirely black can indicate that all of the child nodes are currently displayed with their parent node. A red portion of the subordinate data descriptor can indicate what proportion of child nodes of the parent node is not displayed. A subordinate data descriptor that is entirely red can indicate that none of the subordinate data is currently displayed with a header. A subordinate data descriptor that is entirely white can indicate that the displayed node has no child nodes (i.e., the displayed node is a terminal (i.e., leaf) node. In accordance with another embodiment of the present invention, the first portion and second portion can include text corresponding to the number of displayed and undisplayed child nodes (e.g., a black portion of a subordinate descriptor includes the number of displayed child nodes, a red portion of the subordinate descriptor includes the number of undisplayed child nodes, etc.)

Figure 10:
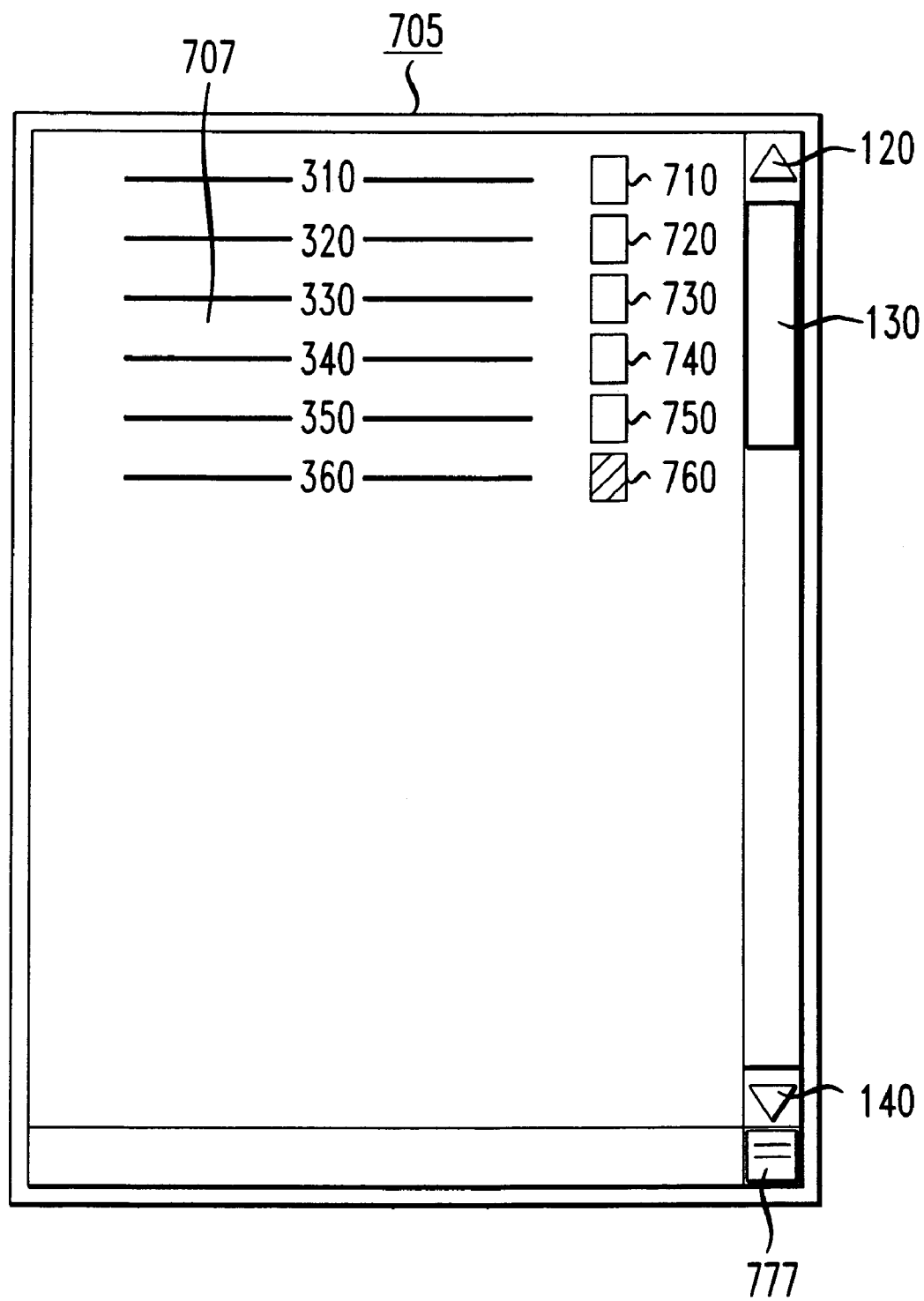
FIG. 10 illustrates a user interface with enhanced scrolling features to display and header scroll a hierarchical data structure in accordance with one embodiment of the present invention.

FIG. 10 illustrates a user interface with enhanced scrolling features to display and header scroll a hierarchical data structure in accordance with one embodiment of the present invention. In particular, FIG. 10 depicts the operation of an embodiment of the present invention after the contact button 777 has been toggled to change the display of hierarchical data in window 705. As shown in FIG. 10, contact button 777 shows a single level hierarchical display has been selected (e.g., by showing an illustration of data including only one level of data). Any subordinate data of the data headers 310–360 is not displayed within window 705. When the contact button 777 is toggled back to display two-levels of hierarchical data within window 705, subordinate data of data headers can once again be displayed.

Subordinate data descriptors 710–750 are each unshaded, and thereby indicate that there is subordinate data of each of data headers 310–350 that is not currently displayed. Subordinate data descriptor 760 is neither shaded (e.g., as are subordinate data descriptor 730–740 of FIG. 9) nor unshaded, and instead shows a third display state (e.g., striped, etc.), thereby indicating that data header 360 is a terminal (i.e., leaf) node that has no subordinate data.

Figure 11:
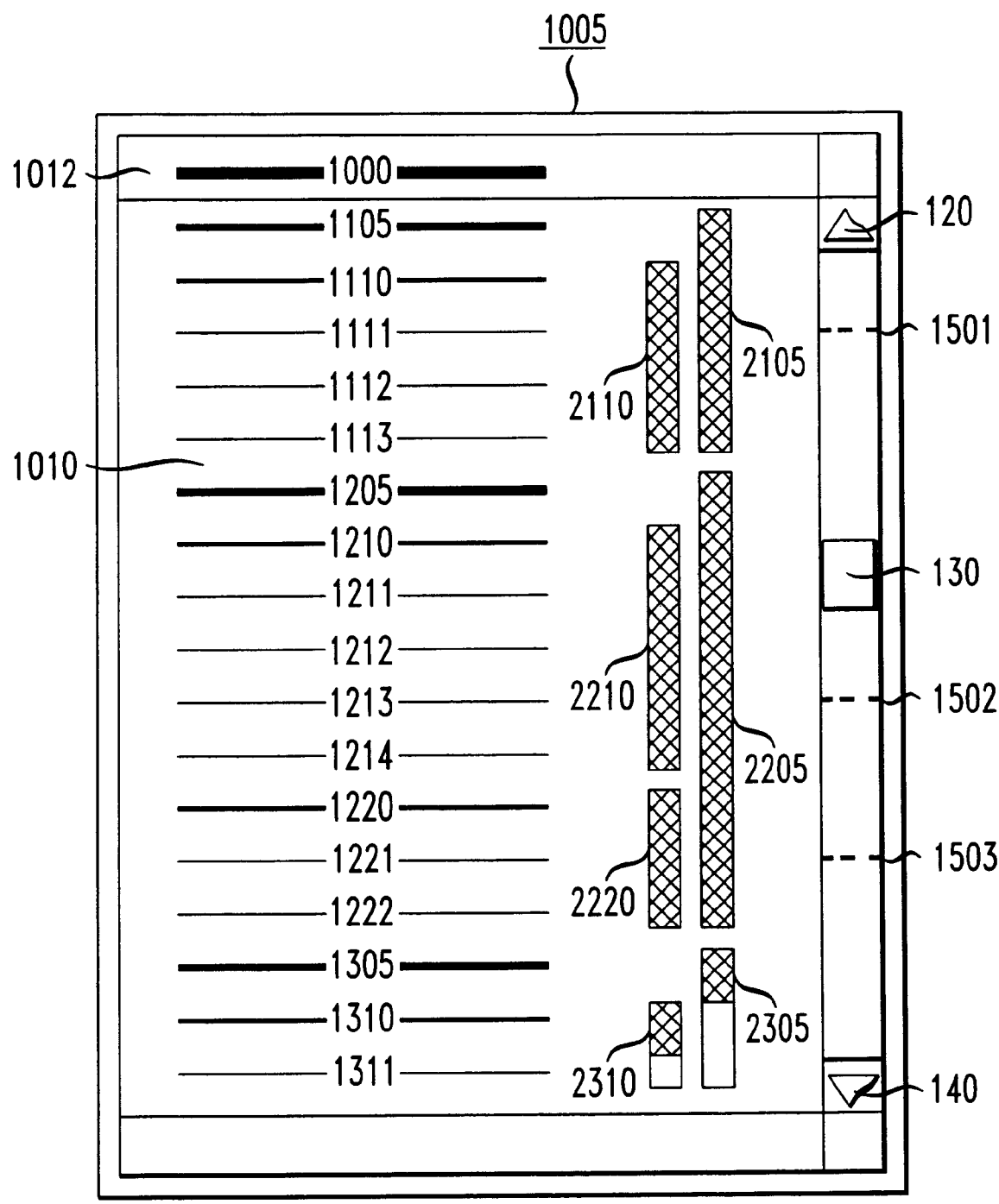
FIG. 11 illustrates a user interface with enhanced scrolling features to display and header scroll a hierarchical data structure in accordance with one embodiment of the present invention.

FIG. 11 illustrates a user interface with enhanced scrolling features to display and header scroll a hierarchical data structure in accordance with one embodiment of the present invention. Window 1005 includes display area 1010 and title bar 1012. In one embodiment four levels of hierarchical data are displayed within window 1105.

Figure 12:
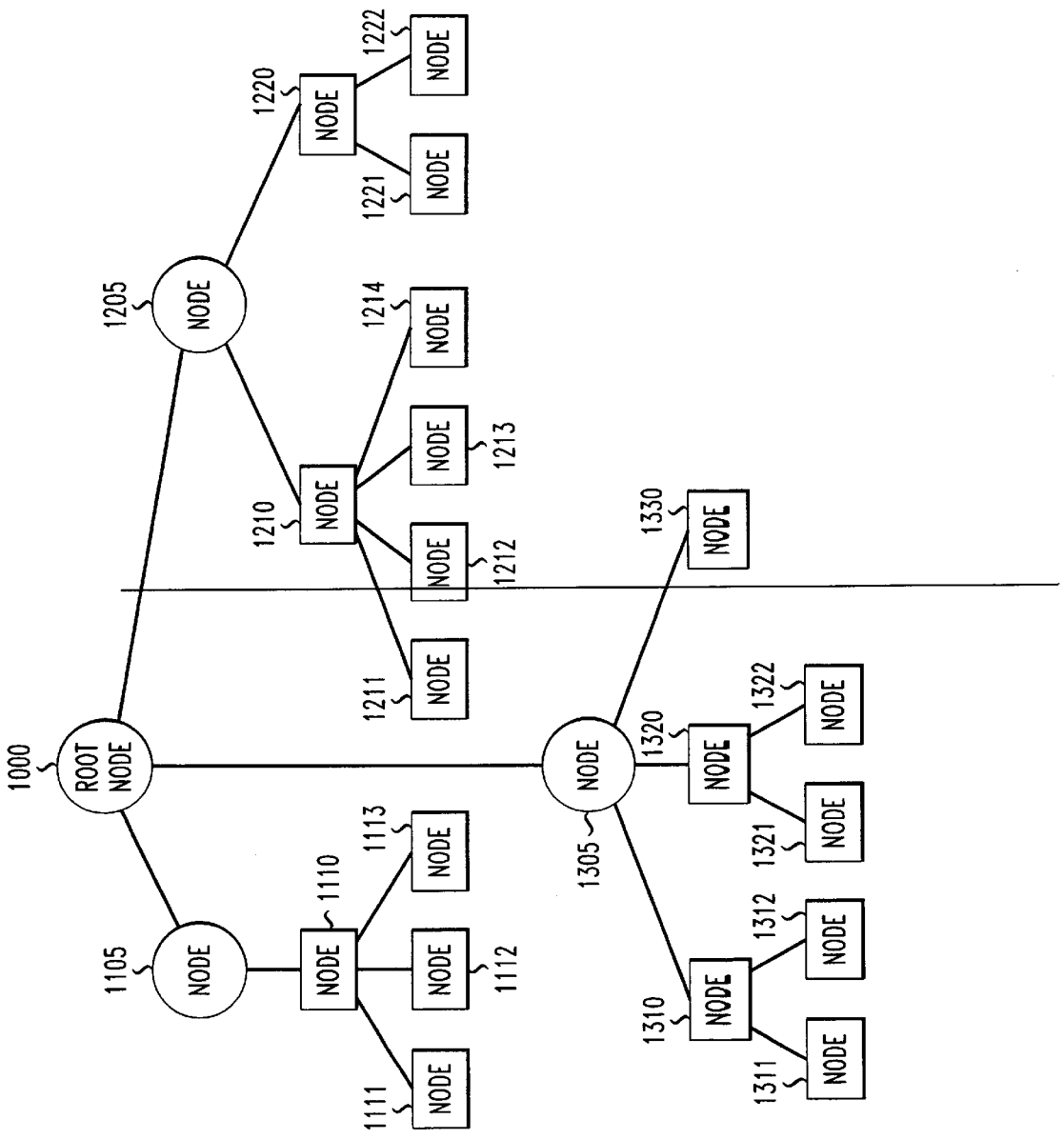
FIG. 12 illustrates the hierarchical relationship of the data displayed in FIG. 11.

FIG. 12 illustrates the hierarchical relationship of the data displayed in FIG. 11. Second-level non-terminal nodes 1105, 1205 and 1305 are child nodes of root node 1000. Second-level non-terminal node 1105 is a parent node of third-level non-terminal node 1110, which is a parent node of fourth-level terminal nodes 1111, 1112, and 1113. Second-level non-terminal node 1205 is a parent node of third-level non-terminal nodes 1210 and 1220, each of which is respectively a parent node of fourth-level terminal nodes 1211, 1212, 1213, and 1214 and fourth-level terminal nodes 1221 and 1222. Second-level non-terminal node 1305 is a parent node of third-level non-terminal nodes 1310 and 1320 and third-level terminal node 1330. Each of third-level non-terminal nodes 1310 and 1320 are respectively a parent node of fourth-level terminal nodes 1311 and 1312 and fourth-level terminal nodes 1321 and 1322. Window 1105 of FIG. 11 displays data corresponding to the nodes of FIG. 12.

Root node 1000 can be displayed within title bar 1012. In another embodiment, root node 1000 can be displayed in a top line of display area 1010. Subordinate nodes of root node 1000 can be displayed within display area 1010 (e.g., data corresponding to the nodes illustrated in FIG. 12). In accordance with one embodiment of the present invention, when scrolling operations are performed upon the data displayed within display area 1010, the hierarchical nature of the data is advantageously displayed by displaying the parent node of a child node when that child node is displayed (e.g., displaying the third level non-terminal node 1110 when fourth-level terminal node 1111 is displayed, and displaying the second level non-terminal node 1105 when third-level non-terminal node 1110 is displayed, etc.).

Window 1005 includes two sets of subordinate data descriptors. The first set of subordinate data descriptors includes subordinate data descriptors 2105, 2205 and 2305, each of which is respectively displayed in association with one of second level non-terminal nodes 1105, 1205 and 1305. Subordinate data descriptors 2105, 2205 and 2305 indicate the proportion of child nodes of second level non-terminal nodes 1105, 1205 and 1305 that are displayed. For example, subordinate data descriptor 2305 includes a first shaded portion that comprises one-third of the display area of subordinate data descriptor 2305 and a second non-shaded portion that comprises two-thirds of the display area of subordinate data descriptor 2305. The ratio of the shaded portion as compared to the entire subordinate data descriptor 2305 (e.g., approximately one-third) corresponds to the ratio of displayed child nodes of second-level non-terminal node 1305 as compared to the total number of child nodes of second-level non-terminal node 1305 (e.g., one third-level node (i.e., 1310) is currently displayed out of the three third-level nodes (i.e., 1310, 1320, and 1330) of second-level node 1305.).

The second set of subordinate data descriptors includes subordinate data descriptors 2110, 2210, 2220, and 2310, each of which is respectively displayed in association with one of third level nodes 1110, 1210, 1220, and 1310. Subordinate data descriptors 2110, 2210, 2220, and 2310 indicate the proportion of any child nodes of second level nodes 1110, 1210, 1220, and 1310 that are displayed. For example, subordinate data descriptor 2310 includes a first shaded portion that comprises one-half of the display area of subordinate data descriptor 2310 and a second non-shaded portion that comprises one-half of the display area of subordinate data descriptor 2310. The ratio of the shaded portion as compared to the entire subordinate data descriptor 2310 corresponds to the ratio of displayed child nodes of third-level node 1310 as compared to the total number of child nodes of third-level node 1310.

In one embodiment, a displayed window can include dynamic node indicators. Each dynamic node insertion indicator can be displayed to indicate a position of a node that was inserted into the display and/or the underlying hierarchical data structure. According to one embodiment of the present invention, chat room data about different artists, albums, and songs can be hierarchically displayed. In one hierarchical data structure, artist data is second-level node data and song data is third-level node data. User chat can be displayed as fourth-level node data corresponding to a song of an artist. In one embodiment, when a user adds an additional chat line about a song of an artist, that additional chat line can be displayed within the display area of a window with an associated dynamic node insertion indicator to show that the additional chat line was recently added (e.g., added within a prior period of time, added after a user last visited the chat room, added after the user last viewed certain data, etc.).

In one embodiment, window 1005 includes dynamic node insertion indicators 1501, 1502, 1503. Dynamic node insertion indicator 1501 indicates that fourth-level node 1111 was added, dynamic node insertion indicator 1502 indicates that fourth-level node 1213 was added, and dynamic node insertion indicator 1503 indicates that fourth-level node 1221 was added. In one embodiment, a dynamic node insertion indicator is displayed to indicate that a node was recently added. In another embodiment, a dynamic node insertion indicator is displayed to indicate that a user has not previously displayed (e.g., viewed) the corresponding node. In a further embodiment, a dynamic node insertion indicator can have a number of degrees of intensity (e.g., degrees of thickness, degrees of brightness, degrees of darkness, etc.) and the degree of intensity is decreased each time the node corresponding to the dynamic node insertion indicator is displayed to the user, scrolled through a window, etc.

Embodiments of the present invention have been described where hierarchical data headers and subordinate data are displayed vertically (e.g., header data is positioned above any of its subordinate data, etc.). In another embodiment of the present invention, hierarchical data headers and subordinate data are displayed horizontally (e.g., a header is displayed to the left of subordinate data, a header is displayed to the right of subordinate data). In a further embodiment of the present invention, hierarchical data is displayed within a three dimensional display and hierarchical data headers and subordinate data are displayed along the depth perspective (e.g., a header is displayed closer to the user and the subordinate data is displayed as further from the user, etc.)

Examples of hierarchical data in accordance with embodiment of the present invention include a hierarchical music data structure including artist data as root node data, album data as subordinate nodes of the artist data, and song data as subordinate nodes of the album data. In another embodiment of the present invention including e-mail data as the hierarchical data, sender data can be parent node data and date/time data can be subordinate nodes of the sender data nodes. In accordance with a further embodiment of the present invention, hierarchical textual data including text headers (e.g., alphanumeric characters, etc.) and subtext (e.g., alphanumeric characters, etc.) can be displayed and scrolled. The text headers can be parent nodes, and the subtext can be subordinate nodes of the text header nodes. In accordance with another embodiment of the present invention, hierarchical data in a spreadsheet can include parent nodes and subordinate nodes. Additional examples of hierarchical data are known and can be displayed in conjunction with embodiments of the present invention.

In accordance with one embodiment of the present invention, instructions adapted to be executed by a processor to perform a method in accordance with an embodiment of the present invention are stored on a computer-readable medium and distributed as software. The computer-readable medium can be a device that stores digital information. For example, a computer-readable medium includes a portable magnetic disk, such as a floppy disk; or a Zip® disk, manufactured by the Iomega Corporation of Roy, Utah (Zip® is a registered trademark of Iomega Corporation); or a Compact Disk Read Only Memory (CD-ROM) as is known in the art for distributing software. The computer-readable medium can be distributed to a user that has a processor suitable for executing instructions adapted to be executed.

Embodiments of the present invention advantageously allow the display and scrolling of hierarchical data including parent and child nodes (e.g., superior and subordinate nodes; root, non-terminal, and terminal nodes; etc.). A child node can be displayed during and after a scrolling operation with its superior node. A graphical or text icon can be displayed for a hierarchical data structure to indicate, among other things, a ratio of nodes currently displayed to a total number of nodes in the hierarchical structure, a ratio of nodes not currently displayed to the total number of nodes, an indication that a node has no child nodes (i.e., is a terminal or leaf node), etc. Embodiments of the present invention can advantageous preserve displaying hierarchical information about displayed hierarchical data and can result in increased efficiency and information content being conveyed to a user.

In the foregoing detailed description, apparatus and methods in accordance with embodiments of the present invention have been described with reference to specific exemplary embodiments. Accordingly, the present specification and figures are to be regarded as illustrative rather than restrictive.

What is claimed is:

1. A method for scrolling a displayed hierarchical data structure including a first parent node and a plurality of child nodes of the parent node, the plurality of subordinate nodes including a first child node and a second child node, the method comprising:

displaying the first parent node in a first position of a display area, displaying the first child node in a second position of the display area, the second position being adjacent the first position;

displaying the second child node in the display area;

receiving a first instruction to scroll at least the second child node in a direction toward the first position; and displaying the second child node in the second position;

wherein the first parent node includes a spreadsheet header and the plurality of child nodes include spreadsheet child nodes.

2. A method for scrolling a displayed hierarchical data structure including a first parent node and a plurality of child nodes of the parent node, the plurality of subordinate nodes including a first child node and a second child node, the method comprising:

displaying the first parent node in a first position of a display area, displaying the first child node in a second position of the display area, the second position being adjacent the first position;

displaying the second child node in the display area;

receiving a first instruction to scroll at least the second child node in a direction toward the first position; and displaying the second child node in the second position;

wherein the first parent node includes artist data and the plurality of child nodes include album data.

3. A method for scrolling a displayed hierarchical data structure including a first parent node and a plurality of child nodes of the parent node, the plurality of subordinate nodes including a first child node and a second child node, the method comprising:

displaying the first parent node in a first position of a display area, displaying the first child node in a second position of the display area, the second position being adjacent the first position;

displaying the second child node in the display area;

receiving a first instruction to scroll at least the second child node in a direction toward the first position; and displaying the second child node in the second position;

wherein the first parent node includes album data and the plurality of child nodes include song data.

4. A method for scrolling a displayed hierarchical data structure including a first parent node and a plurality of child nodes of the parent node, the plurality of subordinate nodes including a first child node and a second child node, the method comprising:

displaying the first parent node in a first position of a display area, displaying the first child node in a second position of the display area, the second position being adjacent the first position;

displaying the second child node in the display area;

receiving a first instruction to scroll at least the second child node in a direction toward the first position; and displaying the second child node in the second position;

wherein the first parent node includes textual header data and the plurality of child nodes include subtext data.

5. A method for displaying hierarchical data, the method comprising:

displaying a parent node;

determining a first value corresponding to a number of child nodes of the parent node;

generating a subordinate data descriptor based at least in part on the determined first value; and displaying the subordinate data descriptor as associated with the displayed parent node.

6. The method of claim 5, wherein displaying the subordinate data descriptor as associated with the displayed parent node includes displaying the subordinate data descriptor adjacent to the displayed parent node.

7. The method of claim 5, further comprising:

determining a second value corresponding to a number of displayed child nodes of the parent node.

8. The method of claim 7, further comprising determining a ratio of the second value to the first value.

9. The method of claim 8, wherein the subordinate data descriptor includes a first portion, and the size of the first portion is based at least in part on the determined ratio.

10. The method of claim 7, wherein the subordinate data descriptor includes a displayed number corresponding to the second value.

11. The method of claim 5, wherein generating the subordinate data descriptor is further based at least in part on the determined second value.

12. The method of claim 11, wherein the subordinate data descriptor includes a first portion corresponding to the determined second value.

13. An apparatus to display hierarchical data, the apparatus comprising:

a. a processor; and b. a memory, coupled to said processor, storing a plurality of instructions adapted to be executed by said processor to display a parent node;

determine a first value corresponding to a number of child nodes of the parent node;

generate a subordinate data descriptor based at least in part on the determined first value; and display the subordinate data descriptor as associated with the displayed parent node.

14. A computer-readable medium storing a plurality of instructions adapted to be executed by a processor to display hierarchical data, the plurality of instructions comprising instructions to:

display a parent node;

determine a first value corresponding to a number of child nodes of the parent node;

generate a subordinate data descriptor based at least in part on the determined first value; and display the subordinate data descriptor as associated with the displayed parent node.

* * * * *